United States Patent
Peddada et al.

(10) Patent No.: US 8,769,704 B2
(45) Date of Patent: *Jul. 1, 2014

(54) METHOD AND SYSTEM FOR MANAGING AND MONITORING OF A MULTI-TENANT SYSTEM

(75) Inventors: Prasad Peddada, Alameda, CA (US);
Dileep Burki, San Jose, CA (US);
Theresa Vietvu, Sunnyvale, CA (US);
Steven Tamm, San Francisco, CA (US);
Logan Henriquez, Palo Alto, CA (US);
Andrew Smith, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 13/229,102

(22) Filed: Sep. 9, 2011

(65) Prior Publication Data
US 2012/0066755 A1 Mar. 15, 2012

Related U.S. Application Data

(60) Provisional application No. 61/381,845, filed on Sep. 10, 2010.

(51) Int. Cl.
*H04L 29/06* (2006.01)
*G06F 15/16* (2006.01)
*H04L 9/32* (2006.01)

(52) U.S. Cl.
USPC .................. 726/28; 726/1; 726/4; 705/59

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |

(Continued)

*Primary Examiner* — Christopher Revak
(74) *Attorney, Agent, or Firm* — Dergosits & Noah LLP; Todd A. Noah

(57) ABSTRACT

Embodiments are described for providing access by application vendors to applications deployed in an enterprise network environment. A package access system defines a support user class in a user profile database for an application executed within organization resources maintained in a multi-tenant data store. The support user is granted read only privileges to metadata of the application. An organization administrator can grant the application vendor access to the application as a support user, allowing the vendor to view and analyze the metadata. The organization administrator can further grant access by a specific support representative to the application as a specific user within the organization user for a limited term. The support representative can then log into the organization and access and use the application in order to diagnose any post-installation usage problems with the application.

20 Claims, 12 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,574,736 B1 * | 6/2003 | Andrews ............... 726/21 |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,920,567 B1 * | 7/2005 | Doherty et al. ............... 726/22 |
| 7,062,502 B1 | 6/2006 | Kesler |
| 7,340,411 B2 | 3/2008 | Cook |
| 7,401,094 B1 | 7/2008 | Kesler |
| 7,523,486 B1 * | 4/2009 | Turner ............... 726/2 |
| 7,546,640 B2 * | 6/2009 | Chang et al. ............... 726/28 |
| 7,620,655 B2 | 11/2009 | Larsson |
| 7,698,160 B2 | 4/2010 | Beaven et al. |
| 7,949,684 B2 * | 5/2011 | Brooks et al. ............... 707/802 |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,275,836 B2 | 9/2012 | Beaven et al. |
| 8,429,089 B2 * | 4/2013 | Juang ............... 705/306 |
| 8,495,067 B2 * | 7/2013 | Ripberger ............... 707/737 |
| 8,495,751 B2 * | 7/2013 | Joyce et al. ............... 726/29 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0088563 A1 * | 5/2004 | Hogan et al. ............... 713/200 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0182963 A1 * | 8/2005 | Phillips et al. ............... 713/200 |
| 2007/0073626 A1 * | 3/2007 | Reeder et al. ............... 705/59 |
| 2007/0136823 A1 * | 6/2007 | Miyazaki et al. ............... 726/28 |
| 2007/0174610 A1 * | 7/2007 | Furuya et al. ............... 713/167 |
| 2007/0186102 A1 * | 8/2007 | Ng ............... 713/165 |
| 2008/0060084 A1 * | 3/2008 | Gappa et al. ............... 726/28 |
| 2008/0195544 A1 * | 8/2008 | Bartek et al. ............... 705/51 |
| 2008/0235786 A1 * | 9/2008 | Roerig ............... 726/14 |
| 2008/0244705 A1 * | 10/2008 | Cromer et al. ............... 726/3 |
| 2009/0063415 A1 | 3/2009 | Chatfield et al. |
| 2009/0199302 A1 * | 8/2009 | So et al. ............... 726/27 |
| 2010/0050267 A1 * | 2/2010 | Nochta ............... 726/27 |
| 2012/0096521 A1 * | 4/2012 | Peddada ............... 726/4 |
| 2012/0150858 A1 | 6/2012 | Ripberger ............... 707/737 |
| 2013/0130651 A1 * | 5/2013 | Deasy et al. ............... 455/411 |
| 2013/0130652 A1 * | 5/2013 | Deasy et al. ............... 455/411 |
| 2013/0130653 A1 * | 5/2013 | Deasy et al. ............... 455/411 |

\* cited by examiner

Grant Login Access    Help for this Page (?)

Salesforce.com Customer Support

To assist you with support issues, a salesforce.com support representative may need to access your data using your login. The support representative will have login access through the expiration date you set below.

User Name  lhenriquez@salesforce.com   Access Expiration Date [         ]

Your Administrator

To assist you with support issues, your administrator may need to access your data using your login. Your administrator will have login access through the expiration date you set below.

User Name  lhenriquez@salesforce.com   Access Expiration Date [2/13/10]

Package Publisher Customer Support

To assist you with support issues, a package publisher may need to access your data using your login. The publisher will have access through the expiration date you set below. Your administrator must first grant the publisher access under Setup | Administration Setup | Security Controls | Grant Publisher Login.

| Publisher | Packages | Access Expiration Date |
|---|---|---|
| ACME Company | Thing-a-ma-jig, Thing Monitoring, Very Serious Forecast Analysis, Silly Report Display, Overpriced Sales Forecaster, Smarty Pants Trigger Thingy | 4/13/2010 |
| Zenith Company | Widget1, Widget2, Widget3 | 4/13/2010 |
| Happy Coders | Happy Gadget |  |

[Save]  [Cancel]

FIG. 10

METHOD AND SYSTEM FOR MANAGING AND MONITORING OF A MULTI-TENANT SYSTEM

CLAIM OF PRIORITY

This application claims the benefit of U.S. Provisional Patent Application 61/381,845 entitled PACKAGE SUPPORT ACCESS, by Prasad Peddada et al., filed Sep. 10, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to multi-tenant database systems, and more specifically to multi-mode testing of database components.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The advent of on-demand service environments has facilitated the development and deployment of third party software and applications for common software platforms, such as enterprise application software platforms. In an on-demand services environment, an enterprise platform for a large number of users provides a number of applications for a variety of uses, such as customer service, order processing, communications, and so on. An enterprise software platform is required to support a number of different entities, such as platform providers, hardware vendors, application developers, end users, consultants, IT (information technology) professionals, and so on. Different developers may produce applications for use by different users and instances of a particular enterprise platform. Such developers often comprise independent software vendors (ISVs) that are companies that specialize in making and selling software for specific enterprise applications. Their software products are often specialized applications and programs that are tailored for specific platforms and improving productivity. Both hardware and software makers often partner with ISVs to encourage and facilitate the development of software applications on their platforms, since generally the more applications that run on a platform, the more value it offers to customers.

Aspects of the package support access system may be incorporated in a multi-tenant database system, such as the salesforce.com service. A multi-tenant architecture allows users or customer organizations (i.e., tenants) to share database resources that are organized as one logical database on one or more central server computer(s), as opposed to maintaining their own locally hosted databases and application programs. The centralized database tables themselves are typically shared and logical structures are employed to ensure differentiation and security among the different tenants. Likewise, the shared application programs can be segregated through access control mechanisms that restrict access and usage to only authorized users or subscribers. A large enterprise platform, such as the Salesforce.com platform may include thousands of developers and platform partners to support hundreds of thousands of end users. The issues of application deployment and maintenance can therefore be quite extensive with regard to customizing, integrating and extending the platform applications to create custom solutions for the users.

For purposes of the current description, the terms "organization," "client," "organization resources," or "client resources" refer to database resources (i.e., data, metadata, programs, and other resources) that are maintained in a central multi-tenant database for access by users who have appropriate access privileges. Such resources are typically maintained in a server and data storage system maintained by a CRM platform provider, as opposed to computers within the actual client businesses themselves.

FIG. 1 is a block diagram illustrating a typical enterprise application network environment with ISVs and end users in present on-demand service systems. The enterprise platform 104 hosts database and application resources for a multitude of different end users 108. The end users 108 in system 100 may be individuals or organizations that use the resources and store data on the enterprise platform server computers. Each end user accesses his or her resources by logging in using established login credentials 110, such as user name and password. The applications 106 may be written and provided by the enterprise platform providers themselves, but more commonly, the applications are written by third party software vendors. Thus, as shown on FIG. 1, one or more ISVs 102 provide applications 106 to be executed on enterprise platform 104. The applications are used by end users 108 who may maintain a customer relationship with both the ISV application maker and the enterprise platform. During the course of normal application development and deployment, many usage problems may arise. Such problems typically require the involvement of ISV and platform administrators or programmers for diagnosis and debugging or patching. In order to provide access for ISVs 102 to support their applications 106 and users 108, the platform administrators must often implement secure temporary access mechanisms. Under present systems, this is typically implemented through the exchange of credentials 112 between the ISV personnel and the platform administrators or between the end users and the ISV. The credentials typically comprise a user name and password that authenticates an ISV to the platform administrator. Depending on the relationship between the ISV and the platform, and/or the amount of support or remedial work required, the exchange of credentials may impose a relatively high degree of administrative overhead. For example, exchanging credentials may require the establishment of new accounts for each service instance, or it may involve the transmission of potentially sensitive information over public communication networks and expose vulnerabilities with respect to spoofing and other hacking methods. Other temporary access methods can include screen sharing techniques in which the ISV views and or assumes control of the end user computer screen through a console portal. This requires a high degree of interaction between the end user and the ISV and also exposes certain security vulnerabilities in the system. Thus, present methods of allowing ISV support for application maintenance in enterprise platform systems that rely on credential exchange or screen sharing present certain disadvantages with respect to processing overhead and system security.

Accordingly, it is desirable to provide techniques enabling efficient testing of multi-tenant database components for different operational modes.

BRIEF SUMMARY

In an embodiment and by way of example, there are provided mechanisms and methods for providing access by application vendors to applications deployed in an enterprise network environment. An application package support access system defines a support user class in a user profile database for an application executed on organization resources within the network. The support user is granted read-only privileges to metadata of the application. An organization administrator can grant the application vendor access to the application as a support user, thus allowing support personnel the ability to view and analyze the metadata. The organization administrator can further grant a specific support representative (or "support rep") access to the application as a specific user within the organization user for a limited term. The support representative can then log into the organization and access and use the application in order to diagnose any problems associated with the post-installation use of the application or runtime diagnostics in the organization. This effectively allows the support representative to "impersonate" the specific organization user by allowing him to login to the organization as that user.

A graphical user interface of the application support access system provides communication and verification tools that allows the organization administrator and application vendor to establish the access grants and term limits, and verify that appropriate support user and login access permissions have been granted for the support representative to access and troubleshoot the application. A licensed management application provided by the enterprise platform provider and executed by the application vendor allows the vendor act as a trusted vendor that can be given access to the organizations application. The support user and organization user access grant within the licensed management framework enables access by a support representative to the application without requiring the exchange of credentials or transfer of sensitive user information among the organization, application vendor, and enterprise platform administrator.

While one or more implementations and techniques are described with reference to an embodiment in which a method for providing an application package test scheme for multiple for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 10 is an example web page for a login grant to an ISV support representative as an organization end user, under an embodiment.

DETAILED DESCRIPTION

Figure 1:
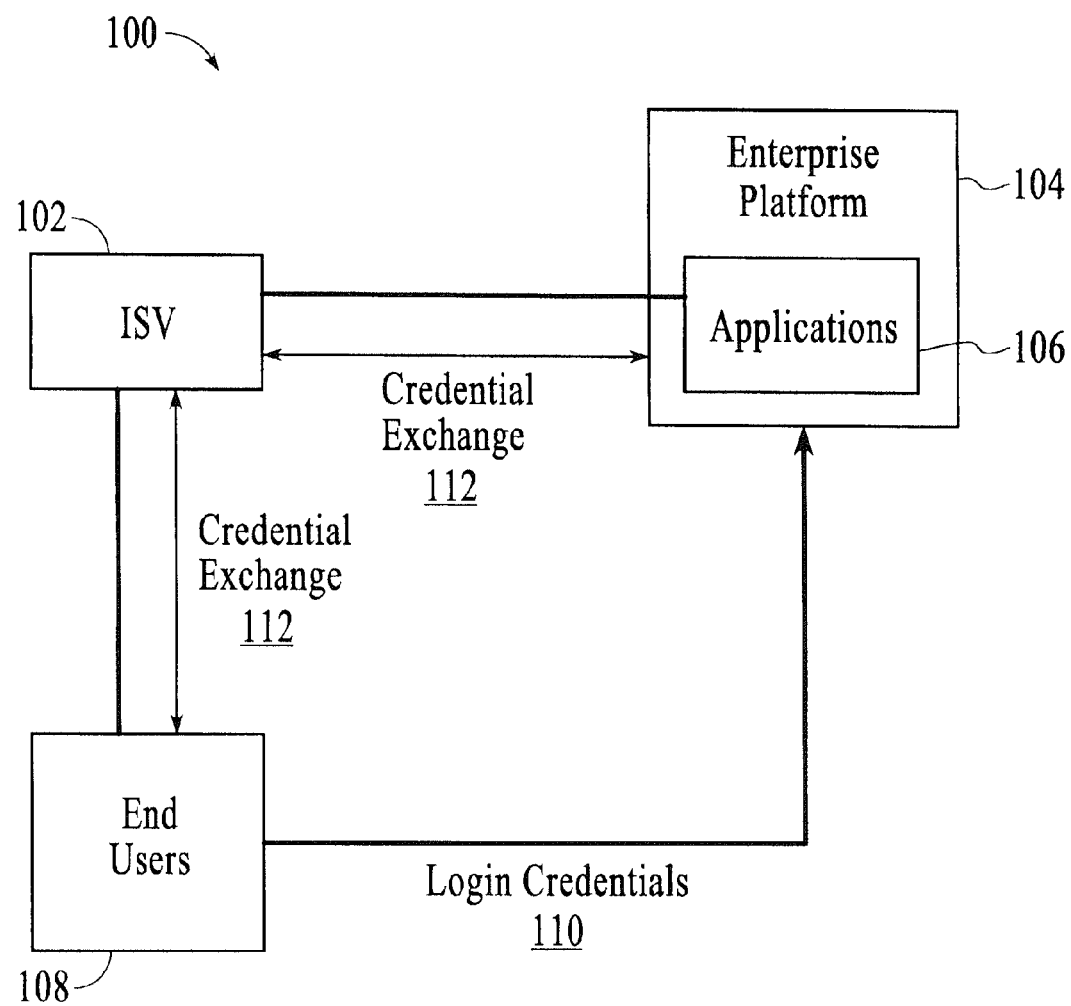
FIG. 1 illustrates a typical enterprise application network environment with ISVs and users in present on-demand service systems.

Systems and methods are described for setting up and maintaining applications installed for organizations in a multi-tenant database system. Access to the applications and organization resources residing on a multi-tenant database platform is provided to third party support representatives without requiring the exchange of credentials or screen sharing techniques.

Embodiments are applicable to a client-server network system comprising an enterprise platform supporting one or more end users. The enterprise platform is configured to host application packages developed by application vendors and accessed by the end users. In an embodiment, the enterprise platform is a multi-tenant software environment in which single instances of application software runs on the platform server and serves multiple organizations. In a multi-tenant system, each application is designed to virtually partition its data and configuration, and each client organization works with a customized virtual application instance. The enterprise platform may be used to implement a Software as a Service (SaaS) distribution model in which applications are provided by a software vendor for use by organization users.

In an embodiment, the enterprise server is maintained by a company that supports the installation of third party applications and packages to individual organizations in an on-demand services environment. To help support independent software vendors (ISVs), a package support access (PSA) system is developed that helps partners support their subscribers without exchanging credentials. In general, the PSA interface works similarly to a grant login function where users may grant login access to their administrator or to an outside support person. With the PSA interface, subscribers may grant access to package publisher support representative. The package publisher support representative can then log into the customer's organizations to identify post-installation problems, reproduce problems experienced by specific users, run diagnostics, check or install patches, or perform other similar support activities.

For purposes of the following description, the term "publisher" refers to an ISV who offers a managed and licensed package through the platform. Such a platform may have a central exchange or store database or public repository that allows developers to catalog applications that have been developed for the platform, and allows users to search for, purchase, and download available applications. Such an exchange may be referred to as an "application exchange" ("AppExchange"), "application store" ("AppStore") or other similar name. The term "subscriber" or "subscriber organization" refers to a company, organization or user that has installed the publisher's licensed package into their organization. The term "package" refers to an application program or set (suite) of application programs that run on the subscriber's organization resources on the CRM platform, such as the Salesforce® platform. A License Management Application (LMA) is a free managed package created by the overall system administrator and is available on the exchange and that lets publishers license their packages. A License Management Organization (LMO) is the publisher organization that has installed an LMA and associated their package with that LMO. The term "support representative" or "support personnel" refers to a technical support person who is authorized by the publisher to troubleshoot problems associated with the application once it is installed and running on the system.

A first portion of the PSA system is a setup access (or "metadata access") interface that lets application and package publishers on the platform support and manage the lifecycle of licensors or their users. With metadata access, subscriber administrators may grant access to package publisher support representative. Once they have been given access, the publisher support representative may log into the customer's organization to identify usage problems and perform other support tasks. Through this interface, access is generally limited to read-only access to organization metadata. The metadata access interface eliminates the need for publishers and subscribers to exchange credentials or setup screen sharing with the subscribers. The PSA system helps ISVs troubleshoot post-installation usage problems that are caused by organization specific configurations.

A second portion of the PSA system is a user login interface that lets ISV support representatives to impersonate a specific user within the subscriber organization. First the ISV support representative accesses the subscriber organization using metadata access. An appropriate subscriber user must first grant login access to the ISV support representative. The support representative can then select a specific user within the subscriber organization to impersonate, and thus gain access to the organization.

Figure 2:
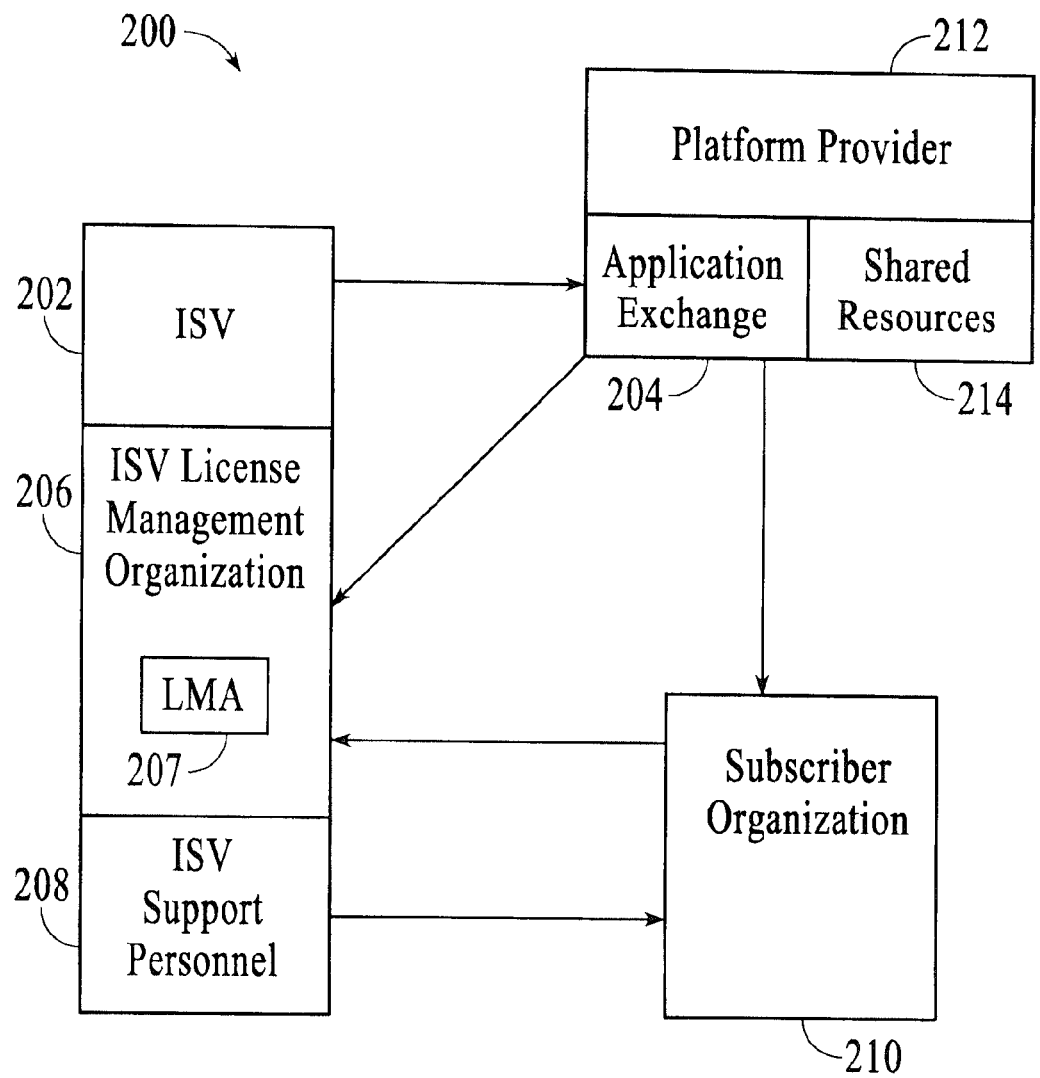
FIG. 2 illustrates a computer network system 100 that implements one or more embodiments of a package support access system for multi-tenant applications.
Figure 3:
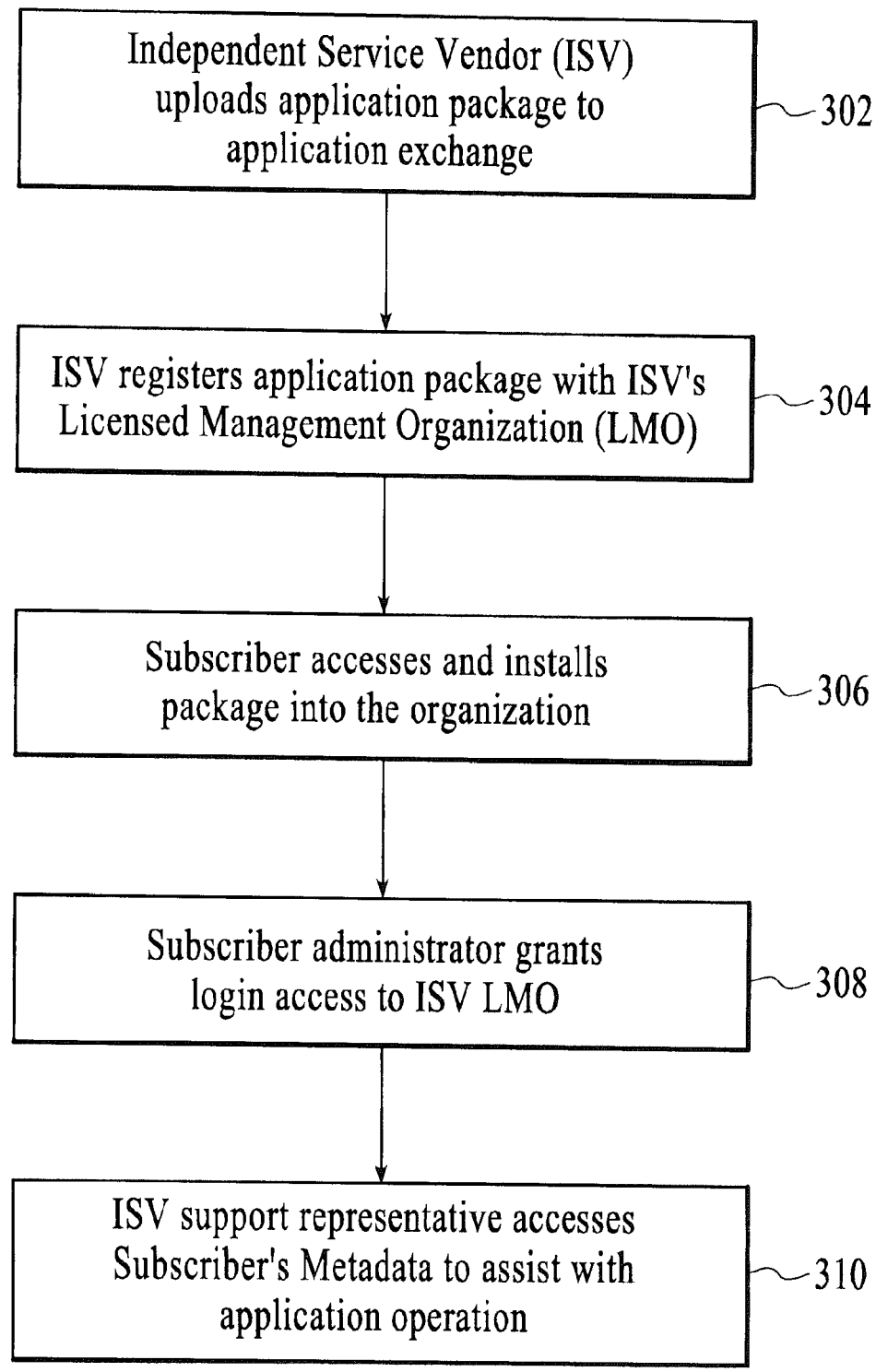
FIG. 3 is a flowchart illustrating a process of implementing a package support access framework, under an embodiment.

FIG. 2 illustrates a computer network system 100 that implements one or more embodiments of a package support access system for multi-tenant applications. The system 200 of FIG. 2 is discussed in relation to the process flow for package support access between an ISV and a subscriber organization, as illustrated in FIG. 3. FIG. 3 is a flowchart illustrating a process of implementing a package support access framework, under an embodiment. The system 200 of FIG. 2 illustrates an enterprise network environment, such as a multi-tenant database system in which a platform provider 212 provides resources 214, such as storage space, applications, databases, and other resources to a plurality of subscriber organizations 210. Such subscribers are typically companies that run enterprise software applications and store and process large amounts of data for their end users.

As shown in FIG. 2, an ISV or developer organization creates an application or application package and uploads the package to an application exchange 204, or similar database, step 302. The ISV registers the uploaded package with an ISV's License Management Organization (LMO) 206, step 304. The subscriber 210 can access a package to be installed in the organization from the application exchange database 204, step 306. The subscriber administrator grants access to the organization data to authorized support representative 208 through the LMO 206, step 308. This allows ISV support representative 208 to access the subscriber organization's metadata to assist with package configuration, operation and maintenance, step 310. As an alternative to uploading the package through an application exchange 204, an application may also be distributed directly from the vendor through a web interface, such as through a URL to the vendor site.

Depending on the actual enterprise-level network implementation, there may be several prerequisites that must be satisfied by both the publisher and subscriber in order to use the package support access interface. These prerequisites ensure the protection and security of the subscriber organization to prevent data loss and other security breaches in the subscriber organization. In a typical large-scale multi-tenant environment, the overall platform provider 212 may provide a license management application (LMA) 207 that allows vendors to utilize the package support access technology. When an ISV installs the LMA it becomes a license management organization 206. Thus, for the embodiment of FIG. 2, for the ISV publisher, the publisher's package must be licensed with the License Management Application (LMA). Only users in the package's License Management Organization may access subscriber organizations. Users who want to access subscriber organizations may require special privileges, such as "permit user to login in to subscriber org" user permission by an administrator in the publisher's LMO organization. To protect the security of subscriber organizations, only trusted support and engineering personnel are typically given this permission. For the subscriber, the prerequisites are that the subscriber must have installed an LMA-licensed package 207 from the publisher, and the LMA-licensed package must have a valid license. An administrator must have granted access to the publisher under appropriate setup controls such as checking a check box or inputting a future date for access by the authorized personnel. The LMA 207 gives the ISV publisher the ability to perform certain tasks regarding the applications installed as part of the organization resources maintained in a multi-tenant system. For example, the ISV can track when applications are installed on a user computer, sales leads can be generated, licenses can be monitored and terminated if necessary, and other similar capabilities. The LMA thus gives an ISV the ability to manage licenses and the application packages. The LMA in conjunction with certain metadata access functions allows the ISV the ability to actually log in to the organization as a user or support user.

As stated above, the package support access interface includes a metadata access portion that gives the publisher support representative read-only access to the metadata of a subscriber organization. The user login portion of the PSA allows publisher support representative to impersonate a specific subscriber or application user. Subscriber organizations must grant access to setup to a publisher before the publisher may use the user login feature.

Metadata access gives publisher support representative read-only access to organization metadata within, for example, the Setup|App Setup area of a subscriber organization. This includes the pages under the Create, Customize, Develop, and Deploy sections. Viewing metadata access provides a way to troubleshoot common configuration issues that may be causing problems or preventing the operation of a package, such as a trigger or a page layout issue. Such configuration issues may commonly occur by customization on the part of the subscriber administrator. Metadata access lets the publisher examine the state of the subscriber organization and give direction to the subscriber administrator, but does not let the publisher make changes themselves. When using metadata access, publishers do not have access to any other portions of setup, nor do they have access to the subscriber's data.

Access to the PSA function by both the publisher and subscriber depends on the user interface implemented within the system. In an embodiment, in order to use metadata access, publisher support representative selects a License Management Application in the application picker in the GUI screen. A "Subscriber Support" tab should appear as part of the tabs associated with the LMA. A subscriber support tab lists the possible subscriber organizations. Unlisted subscribers will require asking the subscriber's system administrator to grant access. A Package Support Access page lists the publishers and packages and appropriate access links redirect into the subscriber's organization. Once inside the subscriber organization, the subscriber's App Setup tree will be displayed allowing the publisher to navigate into the tree to view the subscriber's configuration.

To give a publisher metadata access through the PSA, the subscriber administrator optionally has to grant access to the publisher in the form of date or a check box for such access.

The user login function gives publisher support representative the ability to impersonate a specific user in the subscriber organization. This is useful if the subscriber administrator cannot perform troubleshooting work related to the installed application and wants publisher support representative to do the work. User login is also useful for reproducing problems experienced by a specific user due to their unique data set, role, profile, page layout, or other attributes. User login is only possible if the subscriber's administrator has first granted setup (or metadata) access on the Package Support Access page. In addition, the user whose identity is to be used must grant access on the Grant Login Access page under the appropriate setup page. The user must go to this page, find the line listing the package/publisher name and enter a date in the future for such access. Once the subscriber has performed these tasks, the publisher will see a list of users who have granted access on the top-level application setup/user login page that is displayed when they initially access the subscriber organization. The publisher can then click the "login" link next to the user's name and they will then become that subscriber user. In this manner, the publisher has gained access to the subscriber organization as an actual subscriber user, and will have all the rights and access to the subscriber system that the particular user does with few restrictions.

In an embodiment, certain security mechanisms are implemented to limit publisher access to the subscriber organization and data. First, an ISV's access is limited to organization metadata and it is not allowed to make any changes and is prevented from accessing the subscriber organization's data. This generally provides a low-risk level of access that is safer than providing a publisher with a subscriber user's credentials or letting them login directly as a user. To prevent the grant setup access from giving the ability of publishers to log in as subscribers, setup access should only be granted to package publishers that are trusted. A time limit may be imposed to grant access for only short periods of time (e.g., a few days or hours), such as is necessary to troubleshoot the targeted problem. In addition, strict revocation privileges may be retained to allow the subscriber to revoke both the setup access and user login grants at any time.

Figure 4:
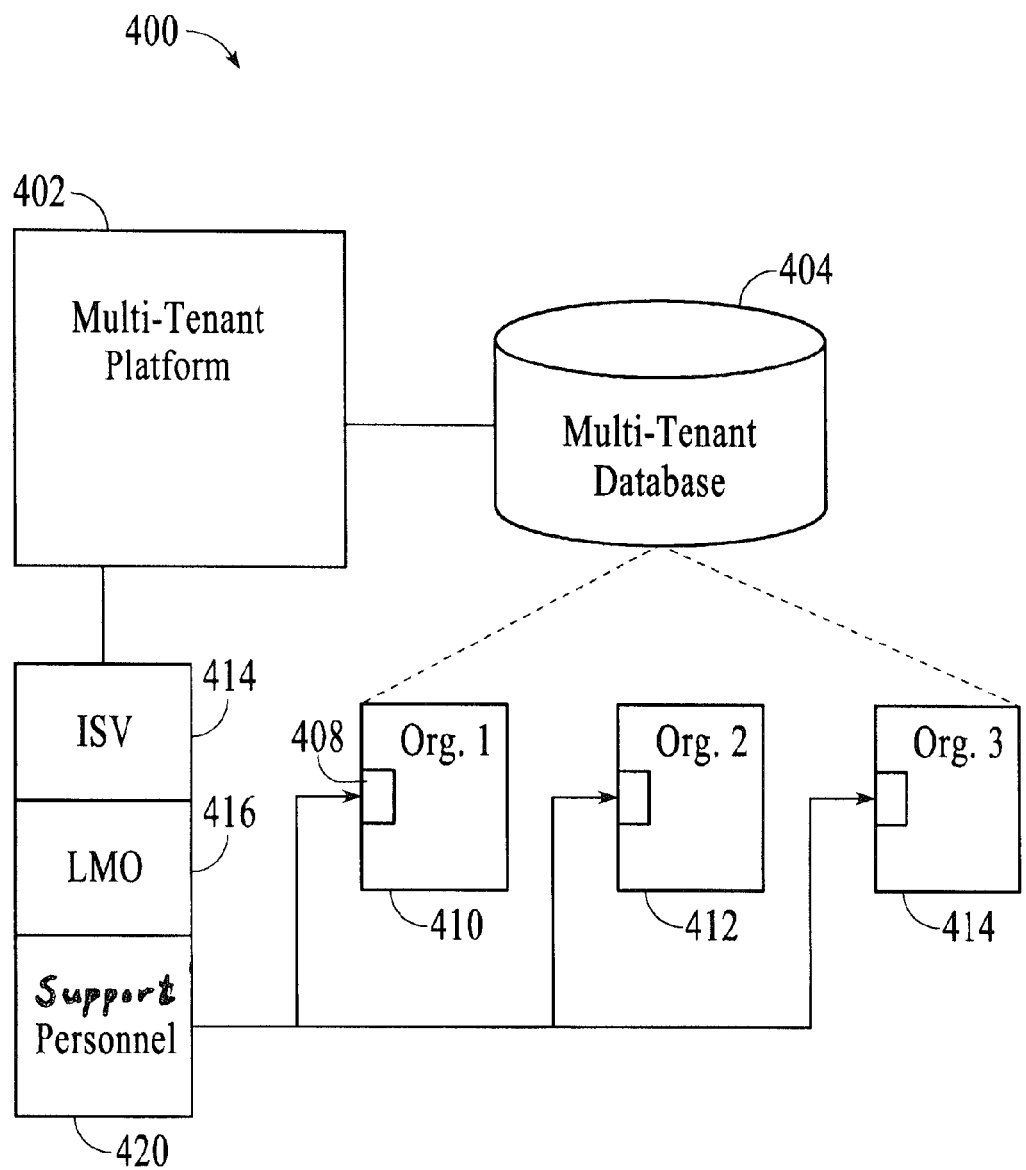
FIG. 4 is a block diagram illustrating support user interfaces into organizations through a package support access system in a multi-tenant network environment, under an embodiment.

FIG. 4 is a block diagram illustrating support user interfaces into organizations through a package support access system in a multi-tenant network environment, under an embodiment. In system 400, a multitenant platform 402 includes a large multitenant database 404 that stores data, applications, and other resources for a plurality of organizations 410-414. The data is stored, segregated, and maintained in accordance with standard multitenant methods known to those of ordinary skill in the art. Each organization maintains a separate account within the multitenant platform and accesses their respective account through established credentials (e.g., username/password). One or more ISV's 414 and their respective LMO's 416 interact with the multi-tenant platform 402 and database 404 to load applications for use by the organizations, as described above.

In an embodiment, the package support access technology creates a support user interface 408 into each organization 410-414. This support user interface allows an ISV to provide direct technical support through appropriate support personnel 420 directly into the organization applications maintained on the multi-tenant platform 402. A unique support user interface 408 is created for each application for each organization. The support user interface allows the ISV support representative 420 to access the organization data or log into the multitenant account with read-only access privileges. In one embodiment, the support user access only allows access to organization metadata. In general, metadata is data about data. Metadata can encompass a wide variety of types and categories. Within the computer network context, metadata can be categorized as three main types: technical metadata, business metadata and process metadata. Technical metadata is primarily definitional while business metadata and process metadata are primarily descriptive. Technical metadata defines the objects and processes in a data warehouse system, as seen from a technical point of view. The technical metadata includes the system metadata, which defines the data structures such as tables, fields, data types, indexes and partitions in the relational engine, and databases, dimensions, measures, and data mining models. Technical metadata defines the data model and the way it is displayed for the users, with the reports, schedules, distribution lists and user security rights. Business metadata is content from the data warehouse and specifies what the data is, where it comes from, what it means and what its relationship is to other data in the data warehouse. Process metadata is used to describe the results of various operations in the data warehouse, and can include start time, end time, CPU seconds used, disk reads, disk writes and rows processed. Such process data is particularly useful when troubleshooting certain processes. The metadata accessed by the support representative 420 through the support user interface can include any or all of these different types of metadata, along with any other relevant data. In general, as used herein, the term metadata refers at least to information about specific data associated with the client in the organization, as well as applications in the organization.

Figure 6:
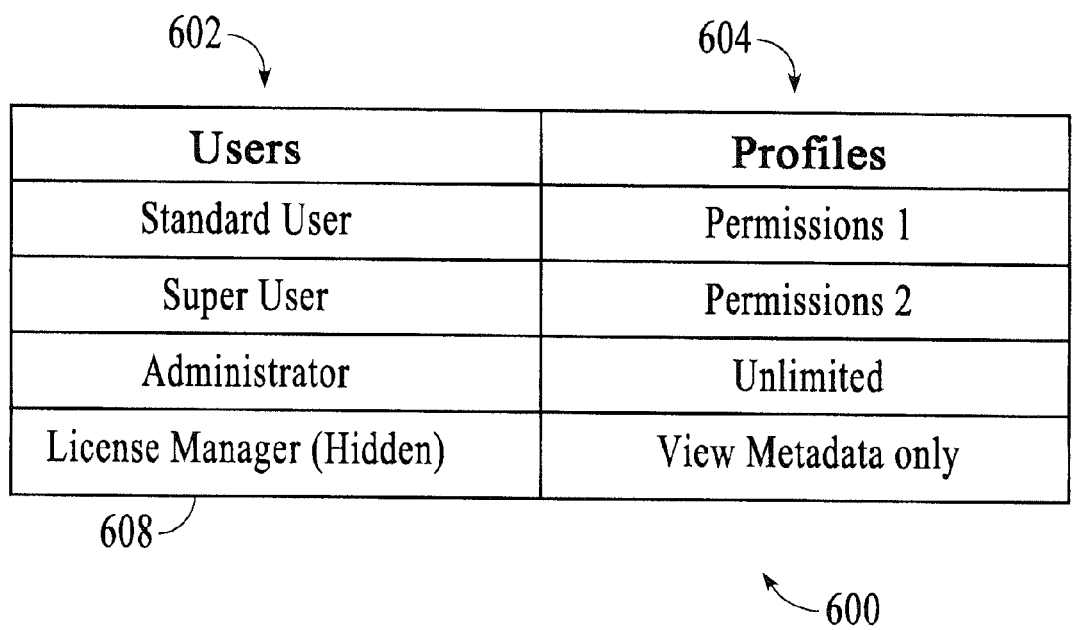
FIG. 6 is a table illustrating the creation of a support user within a user profile structure for a multitenant database system, under an embodiment.

Block 408 in FIG. 4 represents a support user that is created for an application in the corresponding organization, e.g., organization 1, 410. The support user can be defined using a profile definition in an appropriate user database for the organization. The profiles establish the license definitions for the various users and their permissions in the organization. Each user is associated with a security profile, and the security profile dictates what a user can do within the organization with respect to the data and resources in the system 400. FIG. 6 is a table illustrating the creation of a support user within a user profile structure for a multitenant database system, under an embodiment. Table 600 represents a user profile table that is created for each organization and lists the users in a first column 602 and their corresponding profiles in a second column 604. The user profiles specify the privileges or permissions of the users with respect to the applications or other resources in the organization. For the example table of FIG. 6, the users include standard users who are granted a first level of permissions, such as create, read, update and other privileges, super users who are granted a greater set of permissions, and administrators who are granted unlimited permissions. In an embodiment, a support user is created automatically upon installation of an application. The support user may be a license manager for the ISV and by default is granted only limited permissions to view the metadata associated with the organization resources. This essentially allows the support user read-only access to the application metadata. The support user class is created automatically upon installation of an appropriate application using the package support access framework. Although the support user class is automatically created, access as a support user by an ISV must be granted by the organization in a separate access grant procedure. In a multi-tenant environment, table 600 is stored in an appropriate definitions area for the organization.

In an embodiment, granting access through the support user interface 408 to view metadata only does not require further permissions to be granted by either the organization administrator or multi-tenant platform administrator. Viewing the metadata allows the support representative to investigate many potential problems associated with the usage of the application in the multi-tenant system.

The support user interface may be automatically created upon the installation of the application in the organization. This allows the support representative to access the organization metadata for the application on a read-only basis. Any further access to the organization, such as read/write access privileges to customer data must be granted by the administrator.

Figure 5:
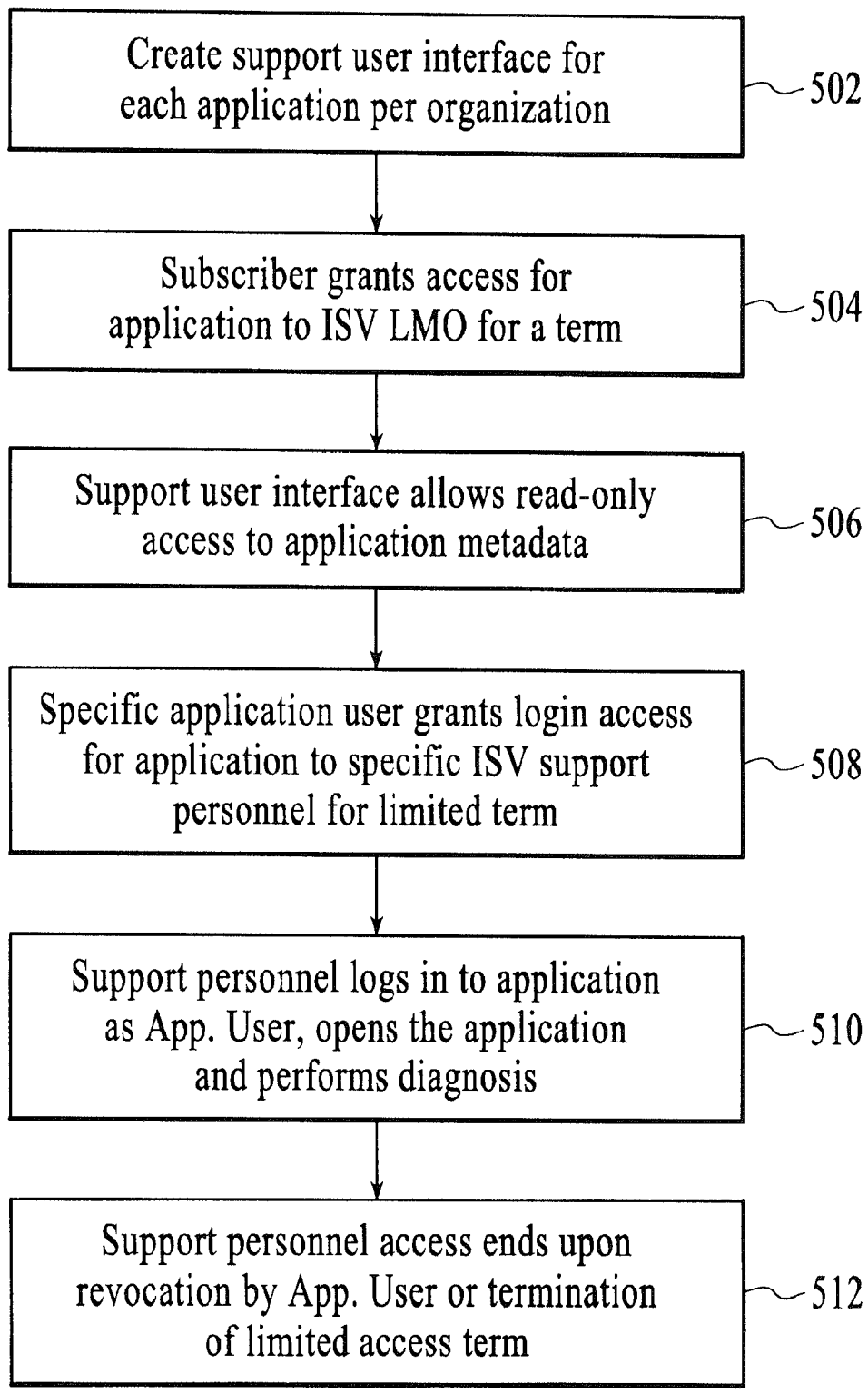
FIG. 5 is a flowchart illustrating a process of implementing granting access to an ISV through a package support access framework, under an embodiment.

FIG. 5 is a flowchart illustrating a process of implementing granting access to an ISV through a package support access framework, under an embodiment. The installation of a package support access application in the multitenant environment of system 400 will automatically create a support user interface for each application per organization, block 502, such as illustrated with reference to FIG. 6. The support user class enables access to the organization data to an allowed set of users. The subscriber allows ISV personnel to view the appropriate metadata through a specific support user access grant, step 504. Typically this access is granted for a relatively long fixed period of time, such as one year.

In certain cases, after the installation of an application in an organization, the organization administrator or organization customer (end user) may notice a problem or issue with the application. This is reported to the ISV by the organization or the multitenant platform administrator. At this point, ISV support representative may log into the organization application using the support user interface 408 and attempt to identify and fix the problem by analyzing the relevant metadata, step 506. If the metadata alone is sufficient to reveal the issue and facilitate a solution, the ISV may then issue a fix and accordingly inform the organization or issue a patch. If however, analysis of the metadata alone is not enough to fix the problem, the support representative may need to log into the actual application as it is executing to analyze and diagnose the problem. In this case, the subscriber administrator grants access for the application to the ISV support representative to log in as the end (subscriber) user, block 506. Typically, this access is granted for only a limited term, such as one or more days, weeks, months, or any appropriate period of time. The limited access is configured to automatically terminate upon the completion of the term. The limited access may be provided in the form of a special unique user name and password given to the support representative. The support representative can then log into the application through his or her own console (e.g., web) interface using this credential set. The limited access may be granted for any appropriate access based on role-based permissions, business rules, and so on. For example, a limited access grant may only allow the technical support representative to log in as a regular user with read and limited write capabilities, or it may allow them to log in as a super user or administrator with greater read/write capabilities. In an embodiment, the technical support representative may be allowed to log in as a CRUD user, that is, one with create, read, update, and delete privileges associated with database storage functions. Additional privileges may also be granted to allow the user to perform specific debugging and modification tasks.

In a practical deployment application, the identity of appropriate support representative 420 for each ISV would be made available to the organizations 410-414. In this manner, special permissions and access rights could be granted by the organizations to the proper personnel. This also allows different support representative to be granted different access rights depending upon their identity. In addition, each organization may have one or more specific users that are allowed to grant access to the appropriate support representative. This allows the interface between the ISV support representatives and the subscriber administrators to list available log in options in an efficient manner, thus reducing the amount of necessary interaction between the people themselves. Thus, as shown in FIG. 5, once the subscriber administrator has granted the ISV LMO access to the application beyond just the metadata, a specific subscriber user (application user) will grant log in access to specific technical support representative to open and use the application, block 508. This support representative can then open the application as the application user and perform whatever diagnostic/remedial tasks are required to try to fix the problem, block 510. Essentially, once the support representative is logged in as the application user, he or she can do anything with respect to the application that the subscriber user can do. This allows the support representative to analyze and debug the problem using their special knowledge as the publisher of the application while logged in as an actual user of the application. Access to the application as the application user by the support user is generally valid until it is expressly revoked by the original application user. Thus, upon completion of the diagnosis or upon termination of the access term, access to the support representative can be terminated, block 512.

The embodiment of the package support access framework illustrated in FIGS. 4 and 5 allows the ISV support representative to log into the installed application as a subscribed user without requiring the exchange of credentials between the ISV and the subscriber, the opening of a web conference session (e.g., WebEx session), and without the need to create or consume a user license for the support representative. This mechanism maintains the security of the application and the organization data within the multi-tenant database environment, and reduces overhead costs relating license fees and the like.

The package support access framework utilizing the support user interface also allows the creation and deployment of special debugging or diagnostic tools for each application that may be utilized by the organization administrators themselves. In this case, the multitenant platform administrator may monitor the applications for each organization and provide debugging tools that can be used by support users using the metadata alone. For example, the tools can gather data relating to process triggers and the like to allow metadata users with tools to allow the subscribers to debug issues directly.

Grant Login User Interface

As described with respect to the embodiment illustrated in FIG. 5, the package support access framework involves the grant of access to the ISV LMO on both the organization level to the ISV LMO, block 506, and on a user-level for the specific support representative, block 508. This access grant structure permits two things: 1) browsing the metadata of the organization, and 2) using login-as an end user (application user) in the organization. The organization administrator may grant, view, and revoke access to one or more ISVs. The administrator specifies a date after which access expires. When the specified date is reached, access is revoked. By default, ISVs may not perform publisher login. As an option, the administrator must explicitly grant access before login may occur.

Figure 7:
FIG. 7 is an example web page for a login grant to an ISV (publisher), under an embodiment.

In a typical implementation, the organization and ISVs interface through a web-based graphical user interface. FIG. 7 is an example web page for a login grant to an ISV (publisher), under an embodiment. Web page 700 is displayed to the organization administrator and lists the publishers, their associated ISV identifiers, and the installed application packages. The publisher list display area 702 also includes an access expiration date. This specifies the date on which access by the ISV as a support user to the organization expires. The administrator can easily view the publishers to which login has been granted by looking at this page and seeing which ones have access expiration dates set. ISVs with access expiration dates set in the past are shown as not having an expiration date. The page also provides command regions to allow the administrator to set or revoke access granted to a specific publisher. The grant to specific ISVs is also reflected in certain definition areas for the organization. For example, depending on actual implementation details, a PermitPartnerLoginGrant user permission may need to be added to the default system admin profile, and the text in the grant page should link to the Personal Settings Grant Login Access page so that administrator can quickly go there next when they want to grant login as themselves.

Figure 8:
FIG. 8 is an example web page for an ISV to login to an organization, under an embodiment.

The user interface also allows the ISV to view and log into the appropriate organizations using the granted access privileges. FIG. 8 is an example web page for an ISV to login to an organization, under an embodiment. FIG. 8 illustrates a web page interface 800 that allows an ISV technical support representative with a PermitSubscriberLogin user permission to log into a subscriber organization on the Subscriber Support Tab. As shown in FIG. 8, and based on an example implementation, the Publisher's LMO has a tab called "Subscriber Support". This tab is available if the LMO organization has the LoginToSubscriber organization permission and the user has the PermitSubscriberLogin user perm. This tab displays a list in display area 802 of the subscriber organizations that have installed a license from the ISV, and have granted publisher login access privileges. If no Subscribers have granted access, the message "no subscribers have granted access" is displayed. If there are one or more subscribers that have granted access, display area 802 shows a table with a login link, the subscriber organization name, the subscriber organization identifier, and the login access expiration date. When the "login" link is clicked, the user is directed into the appropriate subscriber organization support page.

Figure 9:
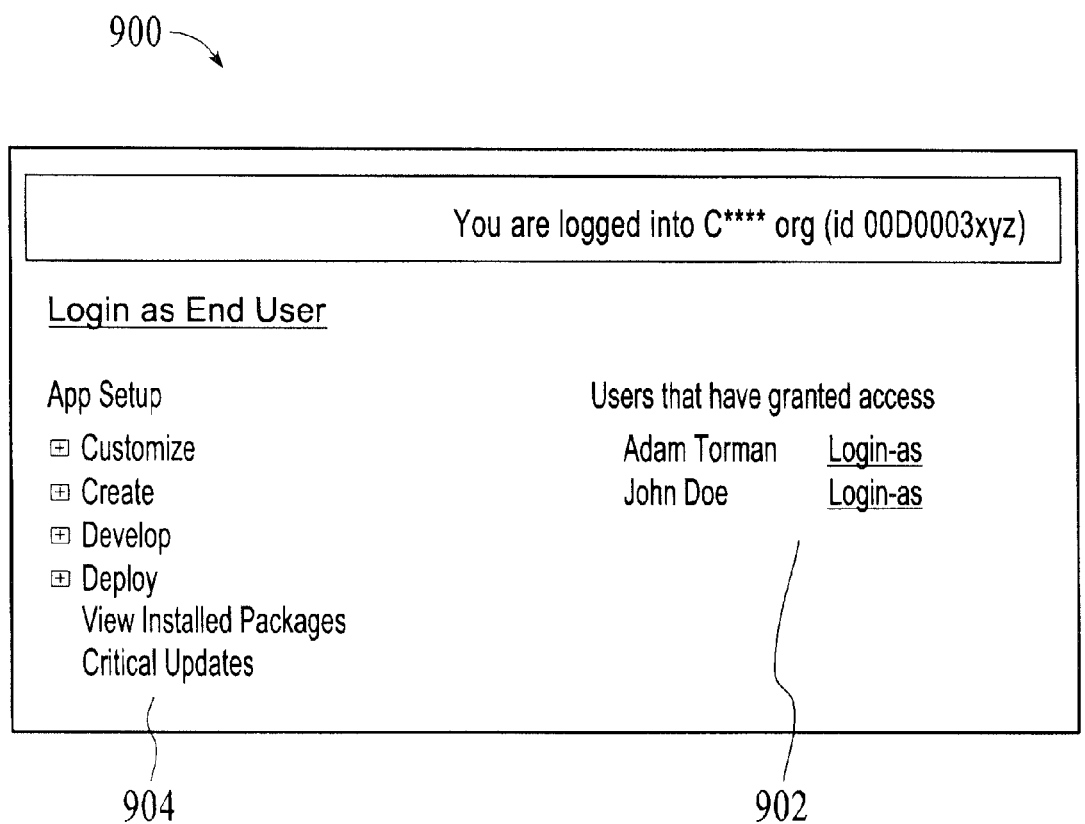
FIG. 9 is an example web page for a subscriber organization support page, under an embodiment.

FIG. 9 is an example web page for a subscriber organization support page, under an embodiment. This page is displayed to an ISV support representative for impersonation of an end user when granted login access privileges as a specific organization user. As shown in FIG. 6, when an ISV support representative is logged into an organization, the logged in support representative sees a reminder that they are in a subscriber organization in bold red letters in the upper right of the screen. The text may read: "You are logged into [sub org name/sub org id]" . This page 900 is the launching point for diagnostic and debugging activities by the support representative. The display area 902 displays a list of users that have granted login-as end user. No other usernames or profiles are accessible. In the sidebar 904 is displayed an App Setup tree, but the other elements of the tree are not displayed. There are no tabs displayed since the support representative may only visit pages under App Setup. ISV personnel that are logged into a subscriber organization, but have not yet logged in as an end user only have access to this page. They do not have any access to any other pages in the subscriber org. Above the App Setup tree in the sidebar is a link to the above page with the label "Login-as End User". ISV personnel that log into a subscriber organization have read-only access to the pages under Setup|App Setup, they do not have any access to other areas of setup, and they do not have any access to the customer's applications or data. This does not apply to ISV personnel that ultimately log in as a specific organization user or an end user.

An organization administrator who desires control over the set of users that can login to the customer organization can grant permissions using a PermitSubscriberLogin function that allows the administrator to grant "login as" access to select profiles. Such login cannot be performed unless the subscriber organization has also granted access to the ISV with whom the ISV support representative is associated.

FIG. 10 is an example web page for a login grant to an ISV support representative as an organization end user, under an embodiment. Web page interface 1000 allows a subscriber organization to grant, view, and revoke login access to an ISV support representative to an installed package to let the support representative reproduce and debug a problem. Once granted this permission, the support representative can impersonate a subscriber organization user who has granted login access. The support representative must first have logged into the subscriber organization as a support user, as described above. If an end user makes a grant here before the organization administrator has granted the publisher login access, an error is returned saying "Your administrator must first grant the publisher login access under the organization metadata."

System Overview

Figure 11:
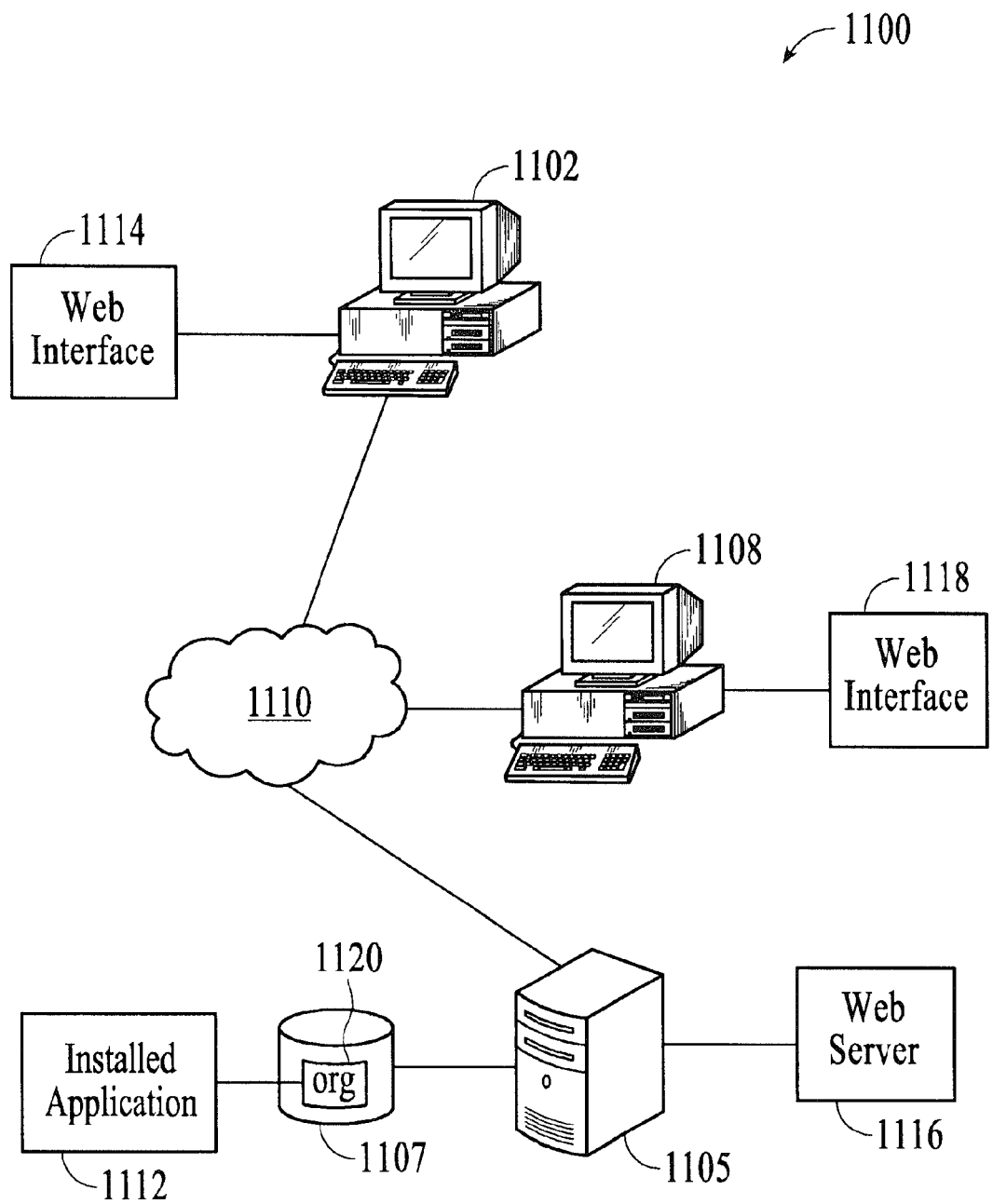
FIG. 11 is a block diagram of a computer network system that can implement embodiments of a package support access framework.

The package support access framework as implemented in the web-based interface illustrated in FIGS. 7-10 can be implemented in an Internet based client-server network system. FIG. 11 is a block diagram of a computer network system that can implement embodiments of a package support access framework. In system 1100, a server computer 1105 that acts as a multitenant database platform is coupled to one or more networked computers 1102 and 1108 through a network 110. The network interface between server computer 1105 and computers 1102 and 1108 may include one or more routers (not shown) that serve to buffer and route the data transmitted among the computers. Network 110 may be the Internet, a Wide Area Network (WAN), a Local Area Network (LAN), or any combination thereof.

Computer 1105 is typically a server level computer capable of supporting multiple computers or terminals, and database storage resources 1107 or any similar computer capable of hosting applications and users over network 1110. The computers 1102 and 1108 of system 100 may each be a workstation computer or it may be a computing device such as a workstation, personal computer, notebook computer, personal digital assistant, or the like, and are used to access the organization resources 1120 hosted by the multi-tenant server 1105.

In a typical implementation, server computer 1105 may be a World-Wide Web (WWW) server that stores data in the form of web pages and transmits these pages as Hypertext Markup Language (HTML) files over the Internet 1110 to client computer 1102. In a web-based network in which network 1110 is the Internet, network server 104 executes a web server process 1116 to provide HTML documents, typically in the form of web pages, to client computers coupled to the network. To access the HTML files provided by server 1116, client computer 1102 executes a web browser process that provides a web interface 1114 to access web pages available on server 1105.

One or more of the computers in system 1100 may execute application programs 1112 to perform certain functions. The applications may be written and provided by an ISV that operates a networked computer 1108. The ISV also access and serves web pages using a web interface 1118. For the CRM-platform embodiment of system 1100, the applications 1112 are installed and executed within the organization resources 1120 in data store 1107 maintained by server 1105 for a user operating a computer or terminal device 1102. The ISV may be granted access to diagnose and debug problems associated with certain installed applications in accordance with the package support access framework described above, and through the example web page interfaces illustrated in FIGS. 7-10.

In one embodiment, the server 1105 is an enterprise server computer that provides comprehensive application and data management functions to a large number of computers. In this case, the computer 1102 is operated by a subscriber organization for the benefit of their customers or end users. The server 1105 (which may be implemented as a plurality of separate server computers) functions as a platform for certain customer relationship management (CRM) and database management functions. CRM is generally understood to be a strategy for managing a company's interactions with customers, clients and sales prospects. The CRM platform includes components that organize, automate, and synchronize business processes, such as sales, marketing, customer service, technical support, and other similar activities. For the embodiment of FIG. 11, server 1105 may be embodied as an enterprise cloud computing server that distributes business software on a subscription basis and hosts applications offsite of the client 1102 site. These applications can be part of a CRM platform that is provided through a Software as a Service (SaaS) model in which software is deployed over the Internet 1110 and/or is deployed to run behind a firewall on the client 1102.

Embodiments of the application support structure can be used in any number IP based network environments. One such environment is a distributed database application that is implemented over a local or wide area network. One example of such an application is a multi-tenant database system. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Figure 12:
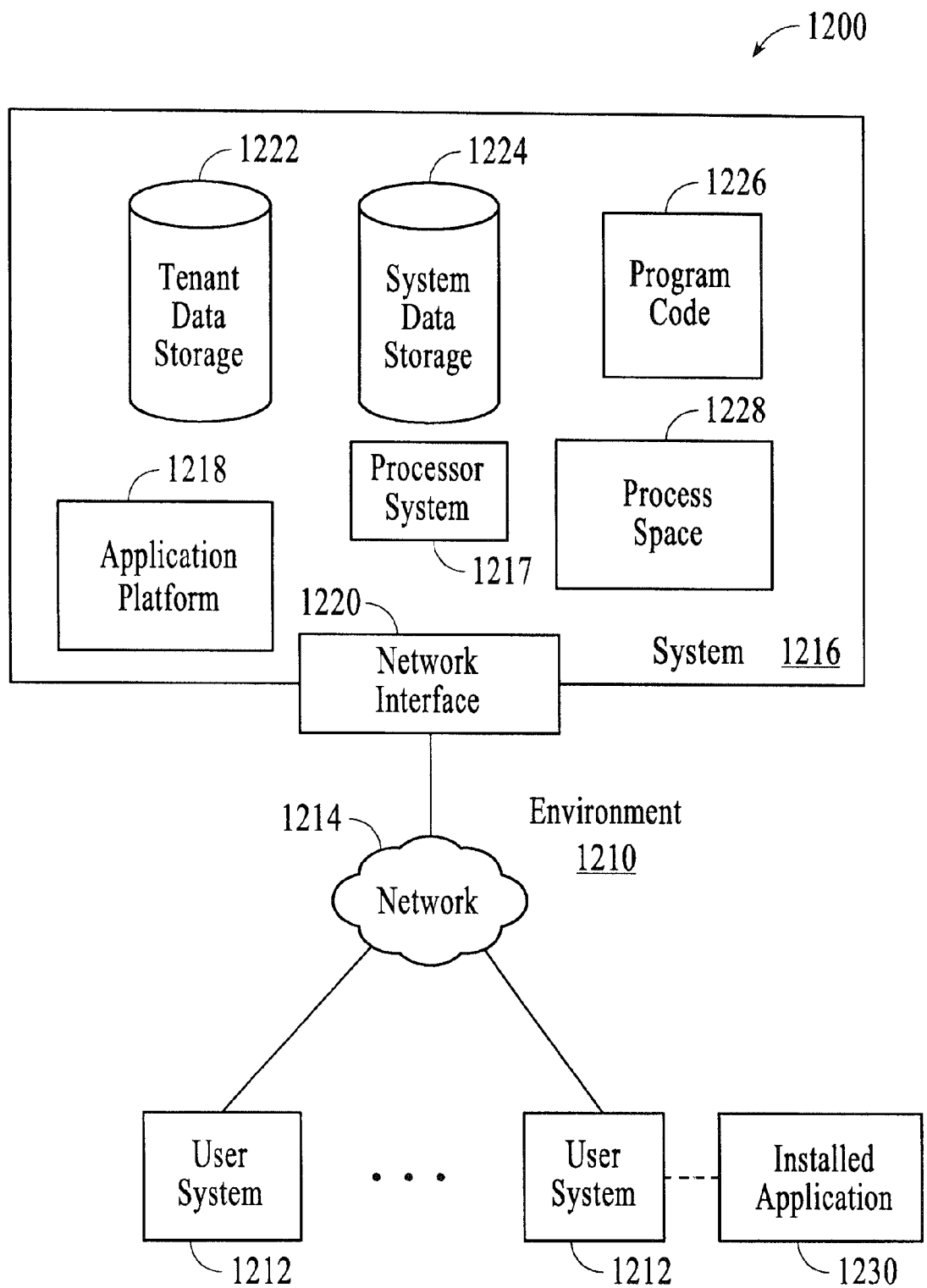
FIG. 12 is a block diagram illustrating an example of an on-demand database service implementing an embodiment of a package support access framework.

FIG. 12 is a block diagram illustrating an example of an on-demand database service implementing an embodiment of a multi-resource test system for testing multiple web serves and/or web sites in the system. FIG. 12 generally illustrates an overall system 1200 that includes an environment 1210 wherein an on-demand database service might be used. Environment 1210 may include user systems 1212, network 1214, system 1216, processor system 1217, application platform 1218, network interface 1220, tenant data storage 1222, system data storage 1224, program code 1226, and process space 1228. In other embodiments, environment 1210 may not have all of the components listed and/or may have other elements instead of, or in addition to, those listed above.

Environment 1210 is an environment in which an on-demand database service exists. User system 1212 may be any machine or system that is used by a user to access a database user system. For example, any of user systems 1212 can be a handheld computing device, a mobile phone, a laptop computer, a workstation, and/or a network of computing devices. As illustrated in FIG. 12, user systems 1212 might interact via a network 1214 with an on-demand database service, which is system 1216.

An on-demand database service, such as system 1216, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the terms "on-demand database service 1216" and "system 1216" may be used interchangeably herein. A database image may include one or more database objects. A relational database management system (RDMS) or the equivalent may execute storage and retrieval of information against the database object(s). Application platform 1218 may be a framework that allows the applications of system 1216 to run, such as the hardware and/or software, e.g., the operating system. In an embodiment, on-demand database service 1216 may include an application platform 1218 that enables creation, managing and executing one or more applications developed by the provider of the on-demand database service, users accessing the on-demand database service via user systems 1212, or third party application developers accessing the on-demand database service via user systems 1212.

The users of user systems 1212 may differ in their respective capacities, and the capacity of a particular user system 1212 might be entirely determined by permissions (permission levels) for the current user. For example, where a salesperson is using a particular user system 1212 to interact with system 1216, that user system has the capacities allotted to that salesperson. However, while an administrator is using that user system to interact with system 1216, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1214 is any network or combination of networks of devices that communicate with one another. For example, network 1214 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 1212 might communicate with system 1216 using TCP/IP and, at a higher network level, use other common Internet protocols to communicate, such as HTTP, FTP, AFS, WAP, etc. In an example where HTTP is used, user system 1212 might include an HTTP client commonly referred to as a web browser for sending and receiving HTTP messages to and from an HTTP server at system 1216. Such an HTTP server might be implemented as the sole network interface between system 1216 and network 1214, but other techniques might be used as well or instead. In some implementations, the interface between system 1216 and network 1214 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1216, shown in FIG. 12, implements a web-based customer relationship management (CRM) system. For example, in one embodiment, system 1216 includes application servers configured to implement and execute CRM software applications as well as provide related data, code, web pages and other information to and from user systems 1212 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1216 implements applications other than, or in addition to, a CRM application. For example, the system may provide tenant access to multiple hosted (standard and custom) applications, including a CRM application. User (or third party developer) applications, which may or may not include CRM, may be supported by the application platform 1218, which manages creation, storage of the applications into one or more database objects and executing of the applications in a virtual machine in the process space of the system 1216.

One arrangement for elements of system 1216 is shown in FIG. 12, including a network interface 1220, application platform 1218, tenant data storage 1222 for tenant data 1223, system data storage 1224 for system data accessible to system 1216 and possibly multiple tenants, program code 1226 for implementing various functions of system 1216, and a process space 1228 for executing MTS system processes and tenant-specific processes, such as running applications as part of an application hosting service. Additional processes that may execute on system 1216 include database indexing processes.

The application platform 1218 within system 1216 represents a set of operations that interact with system components and user systems 1212 through one or more operational interfaces. As described above, the applications may be provided as part of a package that is developed by an ISV for installation on subscriber computers. The installed applications 1230 are executed as part of the organization resources through a user interface of user system 1212.

The applications may be accessed and debugged by ISV support representatives directly accessing the applications after being granted access by subscriber administrators in accordance with the package support access framework described above. The normal use of such applications may be implemented in the multitenant database environment in accordance with embodiments described below with respect to the system 1200 of FIG. 12.

Several elements in the system shown in FIG. 12 include conventional, well-known elements that are explained only briefly here. For example, each user system 1212 could include a desktop personal computer, workstation, laptop, PDA, cell phone, or any wireless access protocol (WAP) enabled device or any other computing device capable of interfacing directly or indirectly to the Internet or other network connection. User system 1212 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 1212 to access, process and view information, pages and applications available to it from system 1216 over network 1214. Each user system 1212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1216 or other systems or servers. For example, the user interface device can be used to access data and applications hosted by system 1216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1212 and all of its components are operator configurable using applications, such as a browser, including computer code run using a central processing unit. Similarly, system 1216 (and additional instances of an MTS, where more than one is present) and all of their components might be operator configurable using application(s) including computer code to run using a central processing unit such as processor system 1217. A computer program product embodiment includes a machine-readable storage medium (media) having instructions stored thereon/in which can be used to program a computer to perform any of the processes of the embodiments described herein. Computer code for operating and configuring system 1216 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1216 is configured to provide web pages, forms, applications, data and media content to user (client) systems 1212 to support the access by user systems 1212 as tenants of system 1216. As such, system 1216 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

In certain embodiments, user systems 1212 (which may be client systems) communicate with application servers to request and update system-level and tenant-level data from system 1216 that may require sending one or more queries to tenant data storage 1222 and/or system data storage 1224. System 1216 may automatically generate one or more SQL statements (e.g., one or more SQL queries) that are designed to access the desired information. System data storage 1224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

For the purpose of the present description, a data object is any type of distinguishable data or information, such as an image, video, sound, text, or other type of data. A data object may include multiple types of distinguishable data, such as an image combined with descriptive text, and it may also comprise a dynamic signal such as a time varying signal. A data object as used herein is to be interpreted broadly to include stored representations of data including for example, digitally stored representations of source information. A data set is a collection of data objects, and may comprise a collection of images, or a plurality of text pages or documents. A user is utilized generically herein to refer to a human operator, a software agent, process, or device that is capable of executing a process or control.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for controlling access to shared on-demand application programs, the method comprising:
    defining a support user class in a user profile database for a shared on-demand application program installed as part of tenant organization resources on the shared platform of a networked multi-tenant system, wherein a support user for one of a plurality of tenant organizations is granted read-only privileges to only that tenant organization's metadata of the shared application;
    enabling an administrator for the one of the plurality of tenant organizations to grant access by a third party to the application as a support user for the tenant organization;
    enabling the administrator for the tenant organization to grant access by the third party to the application as a specific organization user of a plurality of that tenant organization's users for a limited term, wherein the specific organization user is granted use privileges of the application; and
    allowing the third party to login via the tenant organization to the tenant organization resources of the shared application on the shared platform and use the application as the specific organization user for the limited term if the administrator for the tenant organization has granted access to the third party as both a support user and as the specific organization user, thereby enabling the third party to troubleshoot a problem associated with application usage by the specific organization user.

2. The method of claim 1 wherein the third party comprises an independent software vendor that provides both the application to be hosted as part of the organization resources and a license-managed intermediate node between the tenant organization and the shared platform.

3. The method of claim 2 wherein the organization resources are part of a multitenant database application maintained by a platform provider, and wherein the hosted application comprises a package of one or more programs accessible to the organization through login credentials established by the platform provider.

4. The method of claim 3 wherein the application is cataloged in an application exchange maintained by the platform provider.

5. The method of claim 4 wherein the application is uploaded to the application exchange by the independent software vendor in accordance with business rules established between the platform provider and the independent software provider.

6. The method of claim 5 wherein the database application comprises part of a customer relationship management (CRM) system and the server computer functions as a platform for the CRM system, and wherein the application is executed by end users of the organization.

7. The method of claim 5 further comprising:
    providing a license management application to the independent software vendor;
    authorizing the independent software vendor to be a licensed management organization through execution of the license management application; and
    restricting access grants by the organization administrator to the third party based on authorization of the third party as a licensed management organization.

8. The method of claim 7 further comprising:
    providing a first graphical user interface allowing the organization to view one or more authorized licensed management organization, and grant access to a licensed management organization as a support user for the application;
    providing a second graphical user interface allowing the organization to identify the specific organization user as a user with access to the application and define the limited term; and
    providing a third graphical user interface allowing the organization to grant login privileges to a support representative within the licensed management organization to login to the organization and use the application as the identified user.

9. The method of claim 3 wherein the support user class is created automatically upon uploading of the application to the application exchange by the independent software vendor.

10. The method of claim 9 wherein access by the independent software vendor as a hidden vendor is granted for a first time period, and access to the application as the identified user is granted for a second time period.

11. A system for controlling access to shared on-demand application programs executed on a shared multi-tenant database server in a computer network, the system comprising:
    a processor-based application executed on a computer and configured to:
        allow a software support representative to access a shared application provided by a software vendor for execution in tenant organization resources maintained for a client tenant organization on a shared platform of the multi-tenant database server;
        enable an administrator of the tenant organization to grant support user access for the application to the software support representative, wherein such support user access grant allows read-only privileges to only that tenant organization's metadata of the shared application;
        enable the administrator of the tenant to grant access by the software support representative to the application as a specific tenant organization user of a plurality of the tenant organization's users for a limited term, wherein the specific tenant organization user is granted use privileges of the application limited to that tenant organization's license and data; and
        allow the support representative to login to the tenant organization resources and use the application as the specific organization user for the limited term if the tenant administrator has granted access to the third party as both a support user and as the specific organization user, thereby enabling the support representative to troubleshoot a problem associated with application usage by the specific organization user, wherein the limited term is defined by one of an explicit revocation of access rights by the administrator, and an expiration of a time period defined by a date selection.

12. The system of claim 11 wherein:
a provider of the shared platform maintains a server computer coupled to the computer network hosting the organization resources;
the software vendor produces the application and provides it to be hosted on the server computer for use by the organization; and
a license management organization enables a license-managed intermediate node of the computer network between the tenant organization and the shared platform.

13. The system of claim 12 wherein the server computer supports a multi-tenant database application maintained by the platform provider, and wherein the hosted application comprises a package of one or more programs accessible to the organization through login credentials established by the platform provider.

14. The system of claim 13 wherein application is hosted on the server computer as part of the organization resources, and wherein the application is cataloged in an application exchange maintained by the platform provider, and further wherein the application is uploaded to the application exchange by the software vendor in accordance with business rules defined by the platform provider.

15. The system of claim 14 wherein the database application comprises part of a customer relationship management (CRM) system and the server computer functions as a platform for the CRM system, and wherein the application is executed by end users of the organization.

16. The system of claim 14 wherein the support user access is enabled in an organization database maintained by the platform provider through the creation of a support user class that is defined automatically upon installation of the application in the organization resource site.

17. A non-transitory machine-readable medium containing one or more sequences of instructions for controlling access to shared on-demand application programs on a computer network, the instructions configured to cause a processor to:
define a support user class in a user profile database a shared on-demand application program installed as part of tenant organization resources on the shared platform of a networked multi-tenant system, wherein a support user for one of a plurality of tenant organizations is granted read-only privileges to only that tenant organization's metadata of the shared application;
enable an administrator for the one of the plurality of tenant organizations to grant access by a third party to the application as a support user for the tenant organization;
enable the administrator for the tenant organization to grant access by the third party to the application as a specific organization user of a plurality of that tenant organization's users for a limited term, wherein the specific organization user is granted use privileges of the application; and
allow the third party to login via the tenant organization to the tenant organization resources of the shared application on the shared platform and use the application as the specific organization user for the limited term if the administrator for the tenant organization has granted access to the third party as both a support user and as the specific organization user, thereby enabling the third party to troubleshoot a problem associated with application usage by the specific organization user.

18. The non-transitory machine-readable medium of claim 17 further comprising instructions configured to cause the processor to:
provide a license management application to the independent software vendor for execution on the organization resources;
authorize the independent software vendor to be a licensed management organization through execution of the license management application; and
restrict access grants by the organization administrator to the third party based on authorization of the third party as a licensed management organization.

19. The non-transitory machine-readable medium of claim 17 further comprising instructions configured to cause the processor to provide a graphical user interface allowing the organization to view one or more authorized licensed management organizations, grant access to a licensed management organization as a support user for the application, identify the specific organization user as a user with access to the application, define the limited term; and
grant login privileges to a support representative within the licensed management organization to login to the organization and use the application as the identified user.

20. The non-transitory machine-readable medium of claim 19 wherein the support user class is created automatically upon installation of the application.

\* \* \* \* \*